United States Patent
Sudak (10) Patent No.: US 9,538,313 B2
(45) Date of Patent: Jan. 3, 2017

(54) APPARATUS, SYSTEM AND METHOD OF DOCKING A MOBILE DEVICE WITH WIRELESS CONNECTOR

(71) Applicant: Intel Corporation, Santa Clara, CA (US)

(72) Inventor: Eran Sudak, Herzliya (IL)

(73) Assignee: INTEL CORPORATION, Santa Clara, CA (US)

( * ) Notice: Subject to any disclaimer, the term of this patent is extended or adjusted under 35 U.S.C. 154(b) by 521 days.

(21) Appl. No.: 13/693,687

(22) Filed: Dec. 4, 2012

(65) Prior Publication Data

US 2014/0059264 A1    Feb. 27, 2014

Related U.S. Application Data

(60) Provisional application No. 61/692,264, filed on Aug. 23, 2012, provisional application No. 61/692,269, filed on Aug. 23, 2012.

(51) Int. Cl.
| | |
|---|---|
| *G06F 13/00* | (2006.01) |
| *H04W 4/00* | (2009.01) |
| *H02G 3/02* | (2006.01) |
| *G06F 1/16* | (2006.01) |

(52) U.S. Cl.
CPC ............ *H04W 4/008* (2013.01); *G06F 1/1632* (2013.01); *G06F 1/1656* (2013.01); *G06F 1/1698* (2013.01); *H02G 3/02* (2013.01)

(58) Field of Classification Search
USPC ......... 710/300–313, 62–64, 72–74, 104–110
See application file for complete search history.

(56) References Cited

U.S. PATENT DOCUMENTS

| | | | |
|---|---|---|---|
| 5,864,708 A | 1/1999 | Croft et al. | |
| 6,331,744 B1 | 12/2001 | Chen et al. | |
| 7,013,163 B2 * | 3/2006 | Jaggers et al. | ................ 455/557 |
| 7,878,863 B2 | 2/2011 | Johansson et al. | |

(Continued)

OTHER PUBLICATIONS

Wireless Gigabit Alliance (WGA) Specifications; WiGig MAC and PHY Specification Version 1.0, Apr. 2010—Final Specification; 311 pages.

(Continued)

*Primary Examiner* — Raymond Phan
(74) *Attorney, Agent, or Firm* — Shichrur & Co.

(57) ABSTRACT

Some demonstrative embodiments include apparatuses, systems and method of transferring data between a mobile device and one or more peripheral devices via a docking device including a wireless connector. For example, a docking device to transfer data between a mobile device and one or more peripheral devices may include a power plug to be connected to a power supply, one or more peripheral connectors to be connected to the one or more peripheral devices for communicating data with the peripheral devices, and a docking connector to connect the docking device to the mobile device. The docking connector may include, for example, a power connector to receive electrical power from the power supply via the power plug and to transfer the electrical power to the mobile device, and a wireless communication unit to communicate the data between the docking device and the mobile device over a wireless communication link.

20 Claims, 3 Drawing Sheets

(56) References Cited

U.S. PATENT DOCUMENTS

| | | | |
|---|---|---|---|
| 8,090,890 B2* | 1/2012 | Rofougaran | 710/304 |
| 8,275,373 B2 | 9/2012 | Julian et al. | |
| 8,553,408 B2 | 10/2013 | Supran et al. | |
| 8,660,492 B2 | 2/2014 | Hong et al. | |
| 8,688,037 B2 | 4/2014 | Chatterjee et al. | |
| 8,842,429 B2 | 9/2014 | Ahn et al. | |
| 2003/0002243 A1* | 1/2003 | Newman et al. | 361/683 |
| 2004/0110472 A1 | 6/2004 | Witkowski et al. | |
| 2005/0246470 A1 | 11/2005 | Brenner | |
| 2005/0288058 A1 | 12/2005 | Chandhok et al. | |
| 2006/0136647 A1* | 6/2006 | Do | G06F 1/266 710/304 |
| 2006/0212637 A1* | 9/2006 | Lo et al. | 710/303 |
| 2006/0236014 A1* | 10/2006 | Yin | G06F 1/1616 710/303 |
| 2007/0254695 A1 | 11/2007 | Langberg et al. | |
| 2008/0278894 A1 | 11/2008 | Chen et al. | |
| 2008/0278899 A1 | 11/2008 | Hotelling et al. | |
| 2008/0318524 A1 | 12/2008 | Rofougaran | |
| 2009/0177908 A1* | 7/2009 | Baarman | G06F 1/1632 713/340 |
| 2010/0081377 A1 | 4/2010 | Chatterjee et al. | |
| 2010/0146308 A1 | 6/2010 | Gioscia et al. | |
| 2010/0203833 A1 | 8/2010 | Dorsey | |
| 2010/0250818 A1 | 9/2010 | Gill et al. | |
| 2011/0171903 A1 | 7/2011 | Toebes | |
| 2011/0248665 A1 | 10/2011 | Smith et al. | |
| 2012/0021808 A1* | 1/2012 | Tseng | G01C 21/265 455/575.1 |
| 2012/0023171 A1 | 1/2012 | Redmond | |
| 2012/0115414 A1 | 5/2012 | Fadell et al. | |
| 2012/0190406 A1* | 7/2012 | Chen | 455/557 |
| 2012/0206090 A1 | 8/2012 | Hyun-Jun et al. | |
| 2012/0265913 A1* | 10/2012 | Suumaki et al. | 710/303 |
| 2012/0282858 A1 | 11/2012 | Gill et al. | |
| 2013/0145050 A1* | 6/2013 | Huang et al. | 710/3 |
| 2013/0173315 A1 | 7/2013 | Dorsey | |
| 2013/0194729 A1* | 8/2013 | Joe et al. | 361/679.01 |
| 2013/0202427 A1* | 8/2013 | Macelroy | 415/208.1 |
| 2013/0252548 A1 | 9/2013 | Levy et al. | |
| 2013/0297844 A1 | 11/2013 | Rosenberg et al. | |
| 2013/0311694 A1* | 11/2013 | Bhamidipati | H04M 1/7253 710/303 |
| 2013/0343247 A1* | 12/2013 | Kasher | 370/311 |
| 2013/0346661 A1 | 12/2013 | Hasenei | |
| 2014/0030985 A1 | 1/2014 | Cordeiro | |
| 2014/0053871 A1 | 2/2014 | Ma et al. | |
| 2014/0059263 A1* | 2/2014 | Rosenberg et al. | 710/303 |
| 2014/0059264 A1 | 2/2014 | Sudak | |
| 2014/0211801 A1 | 7/2014 | Trainin et al. | |
| 2014/0247548 A1 | 9/2014 | Sharma et al. | |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.
U.S. Appl. No. 13/693,639, filed Dec. 4, 2012, 26 pages.
International Search Report and Written Opinion for PCT/US2013/048055, mailed on Sep. 27, 2013; 13 pages.
International Search Report and Written Opinion for PCT Application No. PCT/US2013/048053, mailed on Oct. 18, 2013, 16 pages.
International Preliminary Report on Patentability for International Patent Application No. PCT/US2013/048055, mailed on Mar. 5, 2015, 9 pages.
Office Action for U.S. Appl. No. 13/693,639, mailed Oct. 2, 2014, 18 pages.
International Preliminary Report on Patentability for International Patent Application No. PCT/US2013/048053, mailed on Mar. 5, 2015, 10 pages.
Office Action for U.S. Appl. No. 14/708,260, mailed on Oct. 29, 2015, 18 pages.
Office Action for U.S. Appl. No. 14/708,260, mailed on Apr. 15, 2016, 13 pages.
Advisory Action for U.S. Appl. No. 14/708,260, mailed on Jun. 23, 2016, 9 pages.
Notice of Allowance for U.S. Appl. No. 14/708,260, mailed on Aug. 1, 2016, 8 pages.

* cited by examiner

APPARATUS, SYSTEM AND METHOD OF DOCKING A MOBILE DEVICE WITH WIRELESS CONNECTOR

CROSS REFERENCE

This application claims the benefit of and priority from U.S. Provisional Patent application No. 61/692,264 entitled "Wireless connector", filed Aug. 23, 2012, and U.S. Provisional Patent application No. 61/692,269 entitled "Docking device including wireless connector", filed Aug. 23, 2012 the entire disclosures of both Applications are incorporated herein by reference.

BACKGROUND

Mobile platforms are becoming smaller and smaller, and typically have decreasingly smaller screens and less Input/Output (IO) ports from generation to generation.

Docking stations are commonly used nowadays to extend the IO port array of the mobile platforms, and provide a convenient means for a mobile platform to hook up to a static variety of peripheral devices ("peripherals"), such as displays, monitors, external storage devices, external Hard Disk Drives (HDD), a mouse, keyboards, webcams, communication devices, and the like.

A docking device (also referred to as "docking station") may typically be placed on a table, while being permanently connected to the peripherals, and the user may connect the mobile platform to the docking station ("dock") to utilize the peripherals.

When one evaluates the spectrum of existing connectivity options for connecting the docking station to the mobile platform, one can find several connectivity schemes.

One scheme includes connectorized docking based on a pass-through mechanical connector that carries a variety of signals, e.g., Universal Serial Bus (USB), Peripheral Component Interconnect Express (PCIe), Audio, and the like.

Another scheme includes connectorized docking based on a single cable that carries a particular technology, e.g., USB or Thunderbolt.

Another scheme includes wireless docks, based on wireless technologies, e.g., wireless USB, Wireless-Fidelity (Wi-Fi), Wireless Gigabit (WiGig), and the like.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing WiGig Serial Extension (WSE) protocols (*WiGig Serial Extension (WSE) Specification Draft* 1.02, *August* 2012) and/or future versions and/or derivatives thereof, devices and/or networks operating in accordance with existing WiGig Display Extension (WDE) protocols (*WDE Draft Specification* 1.04, *August* 2012) and/or future versions and/or derivatives thereof, devices and/or networks operating in accordance with existing Bulk Only Transfer (BOT) Protocols ("the BOT protocol") (*Universal Serial Bus (USB) Mass Storage Class Bulk-Only Transport, Revision* 1.0, Sep. 31, 1999) and/or future versions and/or derivatives thereof, devices and/or networks operating in accordance with existing WiGig Bus Extension (WBE) protocols (*WiGig Bus Extension Spec (WBE), Version* 1.0 June 2011) and/or future versions and/or derivatives thereof, devices and/or networks operating in accordance with existing WiGig Secure Digital (SD) Extension (WSD) protocols (*WiGig SD Extension (WSD) PAL Specification Draft* 1.0 August 2012) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11: *Wireless LAN Medium Access Control (MAC) and Physical Layer (PHY) Specifications*, Mar. 29, 2012; *IEEE*802.11 *task group ac (TGac)* ("*IEEE*802.11-09/0308r12—*TGac Channel Model Addendum Document*"); *IEEE* 802.11 *task group ad (TGad)* (*IEEE P*802.11*ad/D*9.0 *Draft Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 3: *Enhancements for Very High Throughput in the* 60 *GHz Band*)) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The phrase "short range wireless communication link" as used herein may relate to a wireless communication link configured to communicate over a range of up to 10 centimeters (cm), e.g., a range of no more than 5 cm. In one example, the short-range wireless communication link may have a range of less than 3 cm, for example, a range of up to two centimeters, e.g., a range of up to one centimeter.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 40 GHz.

The phrase "docking station", as used herein, may relate to an interface connected to one or more peripheral devices, e.g., a display, one or more speakers, a mouse, a keyboard, a Hard Disk Drive (HDD), and/or the like, configured to enable a device to connect to and communicate with the peripheral devices. For example, the docking station may be configured to enable a mobile device, e.g., a mobile computer, to connect to an external display and/or an external keyboard.

Some existing connectivity options for connecting a docking station to a mobile device utilize a connectorized docking scheme, for example, including a mechanical pass-through connector, e.g. USB, PCIe, display port (DP), serial ATA (SATA), Audio, and the like.

Conventional mechanical connectors may be configured according to a mechanical mating scheme. For example, a conventional mobile device may typically include a connector socket configured to mate with a connector plug of a docking device.

Despite having a variety of form factors, these mechanical connectors have common disadvantages.

For example, the mechanical connectors are typically quite large, occupy a significant volume within the mobile device and/or docking device, expensive and require accurate alignment with a receptacle in the docking device, which may pose the risk of mechanical damage due to an improper plug/unplug operation.

Additionally, a cavity created in the body of the device by the connector socket may interfere with the clean lines of a particular industrial design of the device.

Additionally, the mobile device cannot be connected to the plug connector when the mobile device is covered by a case, e.g., unless the case has an aperture cut through. Such aperture may interfere with the industrial design of the mobile device.

Additionally, as the mechanical coupling between the plug and the socket is typically quite strong, the mobile device, connectors and/or cable may be damaged, for example, in cases of accidental yanks of the cable, e.g., by tripping over it.

Additionally, repeated plug/unplug events weaken the socket and the plug and cause abrasion.

Additionally, mechanical sockets are typically prone to improper plugging, e.g., upside down, unaligned etc., which may lead to mechanical damage and/or frustration.

Additionally, the cavity created by the connector socket is susceptible to dust, pocket lint, moisture or damage by foreign objects, e.g., coins or other objects in a pocket.

Additionally, conventional connector sockets for conveying high-speed traffic occupy quite a significant volume within the body of the mobile device. For example, a typical micro USB 3.0 socket and micro HDMI socket may occupy an area of about 113 square millimeters ($mm^2$) on a printed circuit board (PCB) of the mobile device, and a volume of about 265 cubic millimeters ($mm^3$).

Despite being prevalent in today's mobile devices, wireless communication technologies were not able to entirely replace cables. The typical applications of wireless technologies in mobile platforms are WWAN, WLAN and WPAN. While very convenient to use, these technologies usually do not offer the performance, the security and/or the ability to work in dense environment at the same level as cable connectors.

Some demonstrative embodiments include a docking connector including a wireless connector to connect between a docking device and a mobile device (also referred to as "mobile platform"), e.g., a mobile computer, a notebook computer, an Ultrabook™, and the like.

In some demonstrative embodiments, the docking connector may utilize a wireless connector scheme to connect the docking device to the mobile device.

In some demonstrative embodiments, the wireless connector scheme may be configured to connect the docking device to the mobile device, for example, without utilizing a mechanical mating scheme.

In some demonstrative embodiments, the wireless connector scheme may be configured to connect between the docking device and the mobile device without affecting an external surface and/or housing of the mobile device.

Figure 1:
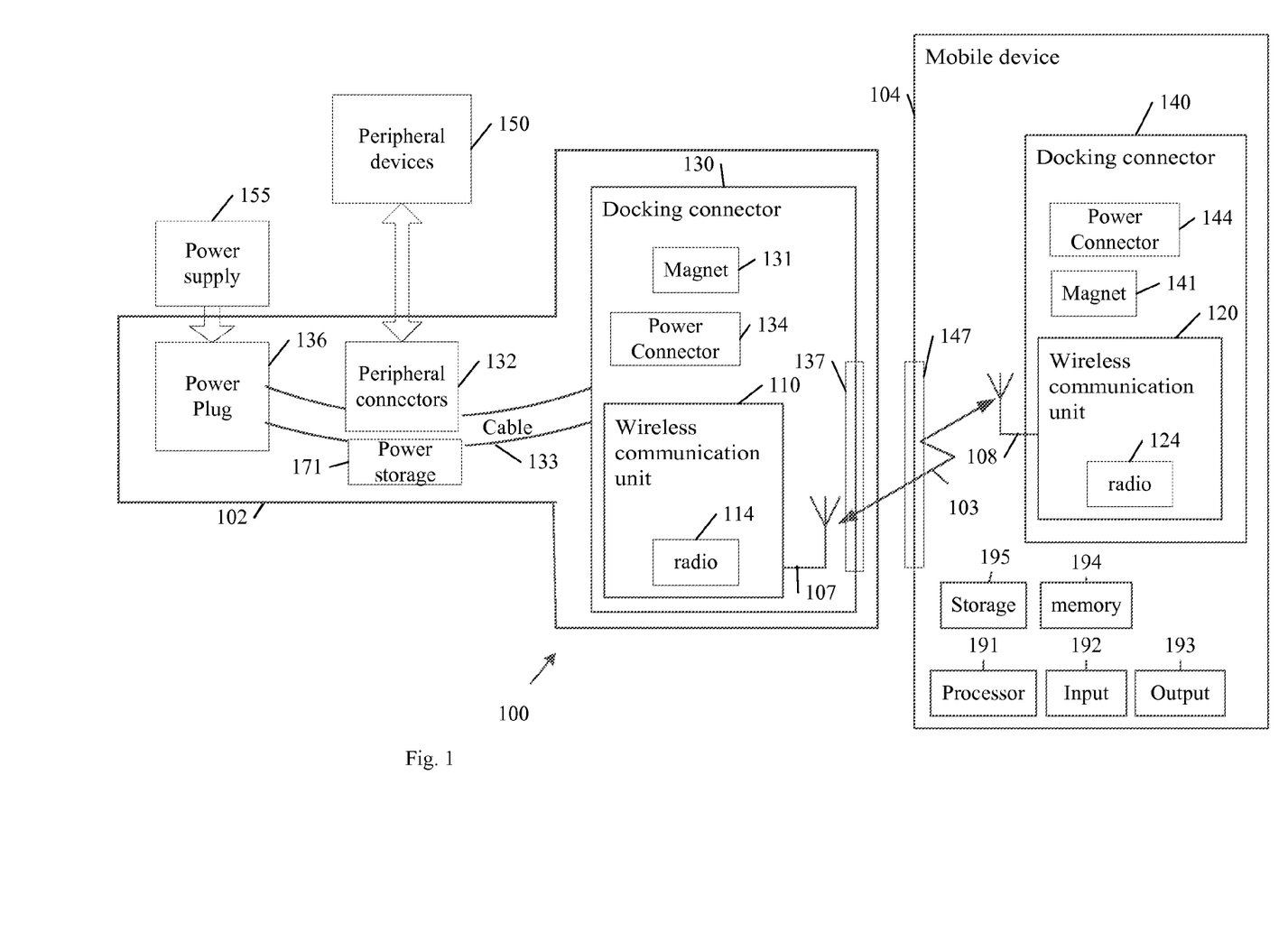
FIG. 1 is a schematic block diagram illustration of a system, in accordance with some demonstrative embodiments.

Reference is now made to FIG. 1, which schematically illustrates a block diagram of a system 100, in accordance with some demonstrative embodiments.

In some demonstrative embodiments, system 100 may include a docking device 102 configured to connect between a device 104 and one or more peripheral devices 150 ("peripherals").

In some demonstrative embodiments, device 104 may include, or may be included as part of a mobile or portable device, for example, a mobile computer, a laptop computer, a notebook computer, a tablet computer, a Smartphone, a handheld computer, a handheld device, a PDA device, a handheld PDA device, an on-board device, an off-board device, a hybrid device, e.g., combining cellular phone functionalities with PDA device functionalities, a consumer device, a vehicular device, a non-vehicular device, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a television, a music player, or the like.

Device 104 may also include, for example, one or more of a processor 191, an input unit 192, an output unit 193, a memory unit 194, and a storage unit 195. Device 104 may optionally include other suitable hardware components and/or software components. In some demonstrative embodiments, some or all of the components of device 104, may be enclosed in a common housing or packaging, and may be interconnected or operably associated using one or more wired or wireless links. In other embodiments, components of device 104 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 104 and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 104.

In some demonstrative embodiments, peripheral devices 150 may include a keyboard, a mouse, a display, speakers, a USB hub, an external storage, and/or the like.

In some demonstrative embodiments, docking device 102 may be configured to transfer data between mobile device 104 and peripheral devices 150.

In some demonstrative embodiments, docking device 102 may enable a user of mobile device 104 to utilize peripherals 150. For example, the user may utilize docking device 102 to work with mobile device 104 by utilizing, for example, an external keyboard, an external mouse, speakers, an external display, an external HDD, and/or the like.

In some demonstrative embodiments, docking device 102 may include one or more peripheral connectors 132 configured to be connected to one or more peripheral devices 150 for communicating data with peripheral devices 150.

In some demonstrative embodiments, peripheral connectors 132 may include one or more input/output (I/O) connectors, e.g., a USB connector, configured to communicate I/O data with one or more I/O devices, e.g., a USB storage device, a USB mouse, a USB keyboard, a printer, and/or the like.

For example, a user may utilize an external mouse, and/or an external keyboard to work with device 104 by connecting the external mouse and keyboard to USB connectors of peripheral connectors 132.

In some demonstrative embodiments, peripheral connectors 132 may include one or more audio/video (A/V) connectors, e.g., an HDMI connector, a DP connector and/or the like, configured to communicate A/V data with one or more A/V devices, e.g., a display monitor, an HDTV TV and/or the like.

For example, a user may utilize an external display, and/or external speakers to work with device 104 by connecting the external display to an HDMI connector of peripheral connectors 132, and/or by connecting the external speakers to an audio connector of peripheral connectors 132.

In some demonstrative embodiments, system 100 may include a wireless docking connector scheme to connect between mobile device 104 and docking device 102.

In some demonstrative embodiments, docking device 102 may include a docking connector 130, and mobile device 104 may include a docking connector 140. Docking connectors 130 and 140 may be configured to connect between devices 104 and 102 over at least one wireless communication link 103, e.g., as described below.

In some demonstrative embodiments, docking connectors 130 and/or 140 may include a wireless communication unit capable of communicating content, data, information and/or signals over wireless communication link 103. For example, docking connector 130 may include a wireless communication unit 110 and docking connector 140 may include a wireless communication unit 120.

In some demonstrative embodiments, wireless communication units 110 and/or 120 may include, or may be associated with, one or more antennas 107 and 108, respectively. Antennas 107 and/or 108 may include any type of antennas suitable for transmitting and/or receiving wireless communication signals, blocks, frames, transmission streams, packets, messages and/or data. For example, antennas 107 and/or 108 may include any suitable configuration, structure and/or arrangement of one or more antenna elements, components, units, assemblies and/or arrays. Antennas 107 and/or 108 may include, for example, antennas suitable for directional communication, e.g., using beamforming techniques. For example, antennas 107 and/or 108 may include a phased array antenna, a single element antenna, a set of switched beam antennas, and/or the like. In some embodiments, antennas 107 and/or 108 may implement transmit and receive functionalities using separate transmit and receive antenna elements. In some embodiments, antennas 107 and/or 108 may implement transmit and receive functionalities using common and/or integrated transmit/receive elements.

In some demonstrative embodiments, wireless communication units 110 and/or 120 may include, for example, one or more radios, e.g., a radio 114 and/or a radio 124, including one or more wireless transmitters, receivers and/or transceivers able to send and/or receive wireless communication signals, RF signals, frames, blocks, transmission streams, packets, messages, data items, and/or data.

In some demonstrative embodiments, wireless communication units 110 and/or 120 may be formed on dedicated Integrated Chips (ICs). For example, wireless communication unit 110 may be formed on an IC housed within docking connector 130, and wireless communication unit 120 may be formed on an IC housed within mobile device 104.

In some demonstrative embodiments, docking connector 140 may be housed within a housing of mobile device 104.

In some demonstrative embodiments, docking connectors 130 and/or 140 may include a plug-less connector, for example, a connector, which does not include mechanical mating elements, e.g., a plug, a socket, and the like.

In some demonstrative embodiments, docking connector 130 may be configured to be physically coupled to docking connector 140. For example, mobile device 104 may include a coupling surface 147 configured to be physically coupled to a coupling surface 137 of docking connector 130. Coupling surface 137 may be part of a housing of docking connector 130 and/or coupling surface 147 may be part of a housing of device 104.

For example, coupling surfaces 137 and 147 may be formed in a shape, which may enable to physically couple coupling surfaces 137 and 147. For example, coupling surface 137 may include, or may be part of, a flat outer surface of a housing of docking connector 130, and/or coupling surface 147 may include, or may be part of, a flat outer surface of a housing of device 104, which may be fitted to coupling surface 137.

In some demonstrative embodiments, docking connectors 130 and 140 may be configured to enable positioning of wireless communication unit 110 in close proximity to wireless communication unit 120. For example, docking connector 130 may be positioned at close proximity to coupling surface 137 and docking connector 140 may be positioned at close proximity to coupling surface 147.

In some demonstrative embodiments, docking connectors 130 and 140 may utilize a magnetic force to physically couple and maintain docking connectors 130 and 140 at close proximity. For example, docking connectors 130 and 140 may include one or more magnetic elements configured to enable coupling of docking connectors 130 and 140 by magnetic force.

In one example, docking connector 130 may include a magnetic element 131 and/or docking connector 140 may include a magnetic element 141, configured to enable coupling of docking connectors 130 and 140 by magnetic force. For example, magnetic elements 131 and 141 may include magnetic elements having opposite poles.

Alternatively, docking connector 140 may not include magnetic element 141, and coupling surface 147 may be formed, at least in part, of a ferromagnetic material, e.g., iron, nickel, metal and/or the like, which may enable magnetic element 131 to physically couple docking connector 130 to coupling surface 147 by magnetic force.

In other embodiments, docking connectors 130 and 140 may utilize any other type of coupling mechanism.

In some demonstrative embodiments, the docking connector scheme described herein may provide a new kind of user experience of plug/unplug ("zero-force plug/unplug"). The zero-force plug/unplug may enhance user experience in the mundane task of connecting mobile device 104 to docking device 102.

In some demonstrative embodiments, wireless communication units 110 and 120 may be configured to form link 103 including a direct link, e.g., a P2P link, for example, to enable direct communication between wireless communication units 110 and 120.

In some demonstrative embodiments, wireless communication link 103 may include a short-range wireless communication link at a multi-gigabit-per-second (MGbs) rate. For example, wireless communication link 103 may include a Wireless-Gigabit (WiGig) link. In other embodiments, wireless communication link 103 may include any other suitable link and/or may utilize any other suitable wireless communication technology.

In some demonstrative embodiments, wireless communication link 103 may include a bidirectional link to enable communicating data from devices 150 to device 104 and from device 104 to devices 150. In other embodiments, wireless communication link 103 may include a unidirectional link, e.g., a unidirectional link to enable communicating data from devices 150 to device 104, or a unidirectional link to enable communicating data from devices 150 to device 104.

In some demonstrative embodiments, wireless communication units 110 and 120 may communicate the data over a WiGig Serial Extension (WSE) to communicate data, e.g., data files, between devices 102 and 104. For example, wireless communication units 110 and 120 may communicate over the WSE to communicate data files between device 104 and peripheral devices 150, e.g., an external storage device, a USB storage device and/or the like.

In some demonstrative embodiments, wireless communication units 110 and 120 may communicate the data over a WiGig Display Extension (WDE), e.g., to communicate video and/or audio data between devices 102 and 104. For example, wireless communication units 110 and 120 may communicate over the WDE to communicate video and/or audio data between device 104 and peripheral devices 150, e.g., an external display, speakers, a microphone and/or the like.

In some demonstrative embodiments, wireless communication units 110 and 120 may communicate the data over a WBE link, a WSD link and/or any other link.

In other embodiments, wireless communication units 110 and 120 may utilize any other suitable wireless communication technology and/or protocol.

In some demonstrative embodiments, wireless communication units 110 and/or 120 may be configured to establish wireless communication link 103 having a very limited range, e.g., so as not to persist for more than a few centimeters (cm) around a coupling point of docking connectors 130 and 140, for example, to avoid interference to surrounding wireless communication devices.

In some demonstrative embodiments, wireless communication link 103 may be configured to overcome a housing of docking connector 130, and/or housing and/or an external case of mobile device 104.

In some demonstrative embodiments, wireless communication link 103 may have a range of no more than five centimeters. In one embodiment, wireless communication link 103 may have a range of less than three centimeters. In another embodiment, wireless communication link 103 may have a range of up to two centimeters. In yet another embodiment, wireless communication link 103 may have a range of up to one centimeter.

In some demonstrative embodiments, the limited range of wireless communication link 103 may enable a solution to a very robust dense environment. For example, the limited range of wireless communication link 103 may enable a relatively large number of wireless communication links to coexist in a common environment, e.g., without interfering with each other. In one example, the limited range of wireless communication link 103 may reduce a probability of wireless communication link 103 interfering with another wireless communication link, e.g., if the wireless communication links are not located within the limited range.

In some demonstrative embodiments, the limited range of wireless communication link 103 may provide a higher level of security, e.g., compared to conventional WPAN, WLAN and/or WWAN links. For example, neighboring devices may not be able to monitor the communication over wireless communication link 103, e.g., if not located within the limited range of wireless communication link 103.

In some demonstrative embodiments, wireless communication units 110 and 120 may utilize a relatively low transmission power to maintain the reduced range of wireless communication link 103.

In some demonstrative embodiments, wireless communication units 110 and 120 may utilize a transmission power, which is lesser than 15 decibel milliwatts (dBm), for communicating over link 103. For example, wireless communication units 110 and 120 may communicate over link 103 utilizing a transmission power of less than 10 dBM, e.g., less than 5 dBm. In one example, wireless communication units 110 and 120 may utilize a transmission power of between −5 dBM and 5 dBM, e.g., between −2 dBm and 2 dBm. For example, wireless communication units 110 and 120 may utilize a transmission power of 0 dBm for communicating over link 103.

In some demonstrative embodiments, the limited range of wireless communication link 103 may enable a reduced power consumption of devices 102 and/or 104, e.g., due to the low transmission power.

In some demonstrative embodiments, docking device 102 may be configured to provide electrical power to mobile device 104.

In some demonstrative embodiments, docking device 102 may include a power plug 136 to be connected to a power supply 155.

In some demonstrative embodiments, docking connector 130 may include a power connector 134 configured to receive electrical power from power supply 155 via power plug 136 and to transfer the electrical power to device 104.

In some demonstrative embodiments, docking connector 140 may include a power connector 144 configured to electrically connect mobile device 104 to a power source of docking device 102, e.g., power supply 155.

In some demonstrative embodiments, power connectors 134 and 144 may be configured to be physically coupled and to transfer the electrical power between power connector 134 and power connector 144.

In one example, power connector 134 may include one or more pins, e.g., spring loaded pins ("Pogo Pins") configured to connect to one or more contacts, e.g., exposed contacts, of power connector 144.

In another example, power connectors 134 and/or 144 may utilize any other mating scheme to transfer electrical power between power connector 134 and power connector 144.

In some demonstrative embodiments, docking device 102 may include a cable 133 configured to connect between docking connector 133, peripheral connectors 132, and power plug 136.

In some demonstrative embodiments, cable 133 may be configured to transfer the data between peripheral connectors 132 and wireless communication unit 110 and to transfer electrical power from power plug 136 to power connector 134.

For example, a first end of cable 133 may be connected to power plug 136, and a second end of cable 133 may be connected to docking connector 130. Cable 133 may include electric wiring to electrically connect between power plug 136 and power connector 134. Device 104 may receive the electrical power from power supply 155 through power plug 136, e.g., via cable 133 and power connectors 134 and 144.

In some demonstrative embodiments, cable 133 may be configured to transfer the data between peripheral connectors 132 and wireless communication unit 110. For example, cable 133 may include data wiring, e.g., copper wires, optical fibers, a serial interface, a parallel interface, and/or any other interface, to transfer the data between peripheral connectors 132 and wireless communication unit 110.

In one example, an external mouse of peripheral devices 150 may be connected to a USB socket of peripheral connectors 132, cable 133 may communicate data between the mouse, via peripheral connectors 132, and wireless communication unit 110, and wireless communication unit 110 may communicate the data with wireless communication unit 120 of mobile device 104 over the WSE.

In another example, an external HDTV display of peripherals devices 150 may be connected to an HDMI socket of peripheral connectors 132, cable 133 may communicate video data between the display, via peripheral connectors 132, and wireless communication unit 110, and wireless communication unit 110 may communicate the video data with wireless communication unit 120 of mobile device 104 over the WDE.

In some demonstrative embodiments, docking device 102 may include, or may be included as part of, a mobile device power adaptor/charger, which may be configured to charge an internal battery of the mobile device and/or supply adapted electrical power, e.g., direct current (DC), to the mobile device. For example, peripheral connectors 132 may be embedded in a power brick of the power adaptor/charger of a notebook, a laptop and the like, and/or cable 133 and/or power plug 136 may include, or may be included as part of, a power cord of the mobile device power adaptor/charger, e.g., as described below with reference to FIG. 2.

In some demonstrative embodiments, docking device 102 may include an internal power storage 171, e.g., a rechargeable power storage, to provide electric power to wireless communication unit 110 and to at least one of peripheral connectors 132. For example, power storage 171 may be included within the power brick, e.g., as described below with reference to FIG. 2.

In some demonstrative embodiments, the docking connector scheme described herein may overcome at least some of the disadvantages of docking devices utilizing conventional mechanical connectors.

For example, docking connectors 130 and/or 140 may allow for cleaner industrial design lines in devices 102 and/or 104, allowing for Industrial-Design innovation ("Connector-less").

Additionally or alternatively, docking connectors 130 and/or 140 may be configured to work through an external case of mobile device 104, thereby eliminating the need for any dedicated apertures in the case.

Additionally or alternatively, docking connectors 130 and/or 140 may use magnetic coupling to attach docking connector 130 to device 104 to provide sufficiently strong coupling, e.g., to withstand normal device manipulation, while enabling quick disengagement, e.g., in case of strong, immediate pull—thus reducing the risk of damage to the device or a person, e.g., in case of accidental yank.

Additionally or alternatively, docking connectors 130 and/or 140 may be completely robust to repeated plug/unplug events and may not suffer from abrasion, e.g., due to the "zero-force plug/unplug" mechanism.

Additionally or alternatively, docking connectors 130 and/or 140 may not be prone to improper plugging.

Additionally or alternatively, docking connectors 130 and/or 140 may eliminate the need of a cavity or socket in devices 102 and/or 104, which may attract dirt, moisture or get clogged by foreign objects.

Additionally or alternatively, docking connectors 130 and/or 140 may be designed to yield a lower volumetric solution versus the conventional mechanical socket, while still allowing a similar amount and/or rate of data transfer.

In some demonstrative embodiments, docking connectors 130 and/or 140 may yield higher security and better robustness in dense environments, e.g., compared to conventional WPAN wireless solutions, while still delivering the performance of a cabled solution.

In some demonstrative embodiments, due to the short range of wireless communication link 103, wireless communication link 103 may be very stable and less sensitive to environmental changes, thus providing a robust wireless connection.

Additionally or alternatively, the docking connector scheme may provide the docking connectors (docking station) as part of a component, e.g., the power charger/adapter described below with reference to FIG. 2, that is anyway carried by the user of the mobile device, thus reducing the number of components to be carried by the user.

Figure 2:
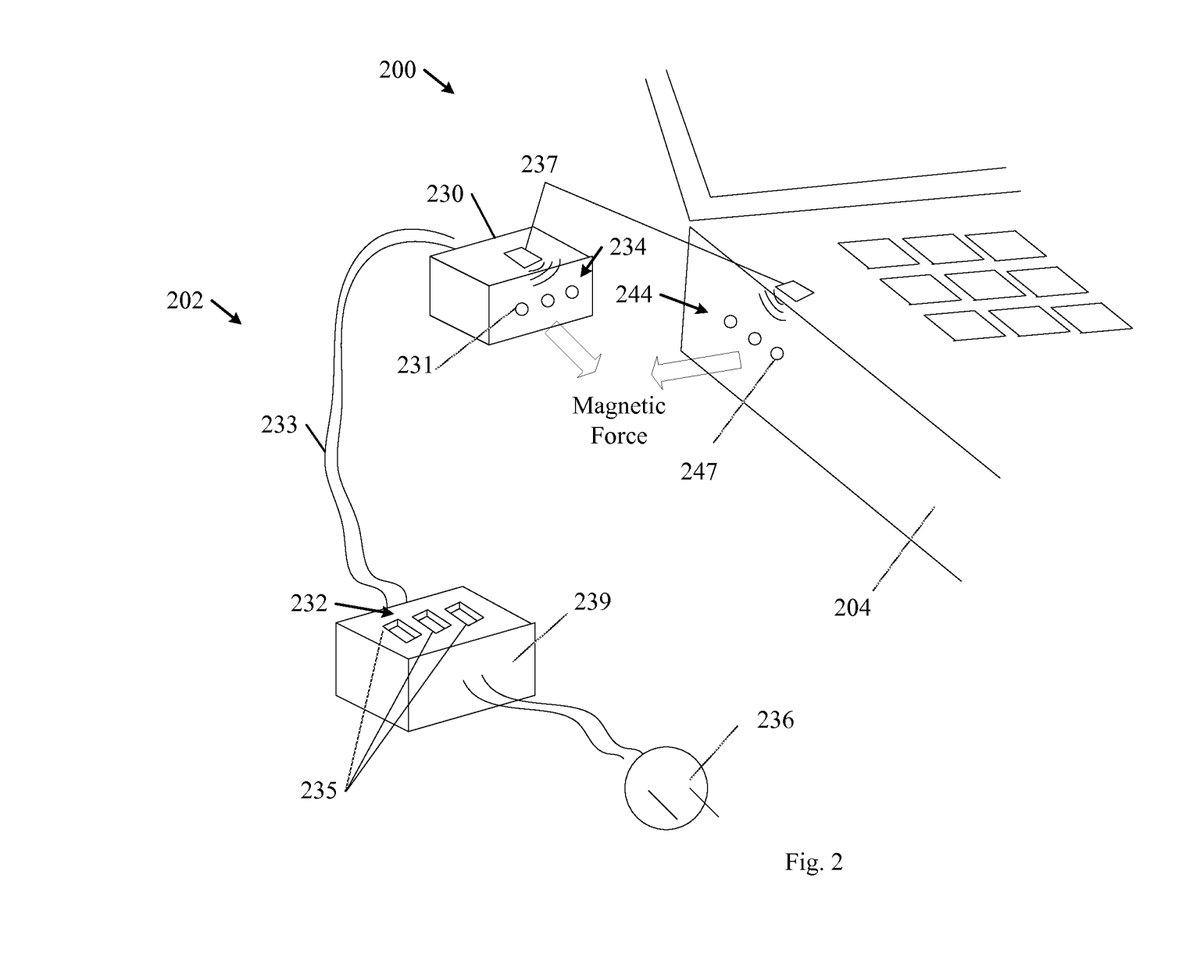
FIG. 2 is a schematic illustration of a wireless docking connector scheme for connecting between a docking device and a mobile device, in accordance with some demonstrative embodiments.

Reference is made to FIG. 2, which schematically illustrates a wireless docking connector scheme for connecting between a docking device 202 and a mobile device 204, in accordance to some demonstrative embodiments. For example, docking device 202 may perform the functionality of device 102 (FIG. 1) and/or device 204 may perform the functionality of device 104 (FIG. 1).

Although the conceptual illustration of FIG. 2 depicts a wireless docking connector scheme for connecting an Ultrabook™ to a docking cable, in other embodiments the docking connector scheme may be utilized for connecting any mobile device, e.g., a Smartphone, a laptop, a notebook, and/or the like, to any other docking device.

As shown in FIG. 2, docking device 202 may include a cable 233, e.g., having the functionality of cable 133 (FIG. 1).

As shown in FIG. 2, docking device 202 may include a power plug 236, e.g., having the functionality of power plug 136 (FIG. 1), connected to a first end of cable 233, configured to be connected to a power supply, e.g., power supply 155 (FIG. 1).

As shown in FIG. 2, docking device 202 may include a wireless docking connector 230, e.g., having the functionality of docking connector 130 (FIG. 1), connected to a second end of cable 233, e.g., instead of a conventional mechanical plug.

In some demonstrative embodiments, wireless docking connector 230 may be attached to device 204 using magnetic force, e.g., by embedding magnets at the corresponding locations within device 204 and/or docking connector 230, or by any other suitable coupling element and/or mechanism, e.g., as described above.

As shown in FIG. 2, cable 233 may be configured to deliver electrical power to device 204.

As shown in FIG. 2, docking connector 230 may include a power connector 234, e.g., having the functionality of power connector 134 (FIG. 1) configured to provide power to mobile device 204.

As shown in FIG. 2, power connector 234 may receive the electrical power through power plug 236 via a power brick 239. Power brick 239 may include an AC/DC component configured to provide adapted power to mobile device 204.

In some demonstrative embodiments, power connector 234 may be configured to be physically connected to a power connector 244, e.g., having the functionality of power connector 144 (FIG. 1), to deliver the electrical power to device 204.

As shown in FIG. 2, power connector 234 may be connected to power connector 244 using a plurality of spring loaded pins 231, e.g., "Pogo Pins", at power connector 234, and exposed contacts 247 at power connector 244. Accordingly, power connector 234 may be able to deliver the electrical power to device 204, while still maintaining the Zero-Force plugging experience.

As shown in FIG. 2, the wireless docking connector scheme may implement dedicated "Wireless Connector" radios, which may be formed on dedicated Integrated Chips (ICs) 237, e.g., one IC within mobile device 204 and one IC within wireless docking connector 230.

As shown in FIG. 2, the dedicated "Wireless Connector" radios on ICs 237 may establish a short range, high throughput link, e.g., having the functionality of wireless communication link 103 (FIG. 1), between docking connector 230 and device 204.

As shown in FIG. 2, docking device 202 may include one or more peripheral connectors 232, e.g., having the functionality of peripheral connectors 132 (FIG. 1), to connect one or more peripheral devices, e.g., peripheral devices 150 (FIG. 1), to docking device 202.

As shown in FIG. 2, peripheral connectors 232 may include one or more sockets 235 configured to mate with a connector of the one or more peripheral devices. For example, peripheral connectors 232 may include a USB socket to mate with a USB plug of a peripheral device, e.g., a USB mouse, a DP socket to mate with a DP plug, an HDMI socket to mate with an HDMI plug, e.g., of an HDTV display, and/or any additional socket and/or plug.

In some demonstrative embodiments, power brick 239 may include an internal power storage, e.g., an internal battery (not shown in FIG. 2), for example power storage 171 (FIG. 1), to store electrical power. The internal power storage may be configured to supply electrical power to device 202, device 204 and/or one or more peripheral devices, e.g., even when docking device 202 is not connected to an external power supply.

In one example, the internal power supply may include a rechargeable power storage, e.g., a rechargeable battery, configured to store electrical power and to provide electrical power to charge an internal battery of device 204, e.g., when power plug 236 is connected to an AC socket. The internal power storage may be configured to provide electrical power to wireless connector 230 and/or connectors 232, e.g., when power plug 236 is not connected to an AC socket. The internal power storage may be configured not to provide electric power to device 204, e.g., when power plug 236 is not connected to an AC socket, for example, if device 204 may utilize electrical power stored by the internal battery of device 204. This configuration may provide a degree of freedom, e.g., the user of device 204 may not be dependent on AC power to get access to connectors 232.

In some demonstrative embodiments, data communicated from device 204 may be siphoned from device 204 via wireless docking connector 230 to one or more of sockets 235, and/or data communicated to device 204 may be transferred from one or more sockets 235 via wireless docking connector 230 to device 204.

As shown in FIG. 2, sockets 235 may be embedded within power brick 239. For example, sockets 235 may be embedded in an outer surface of power brick 239.

In some demonstrative embodiments, docking connector 202 may provide a solution for both data and power delivery to mobile device 204.

Additionally or alternatively, docking connector 202 may be utilized as part of a component, e.g., a power adapter/charger of a mobile device, that is anyway carried by the user of the mobile device, thus reducing the number of components the user is to carry, e.g., compared to a dedicated docking device.

Figure 3:
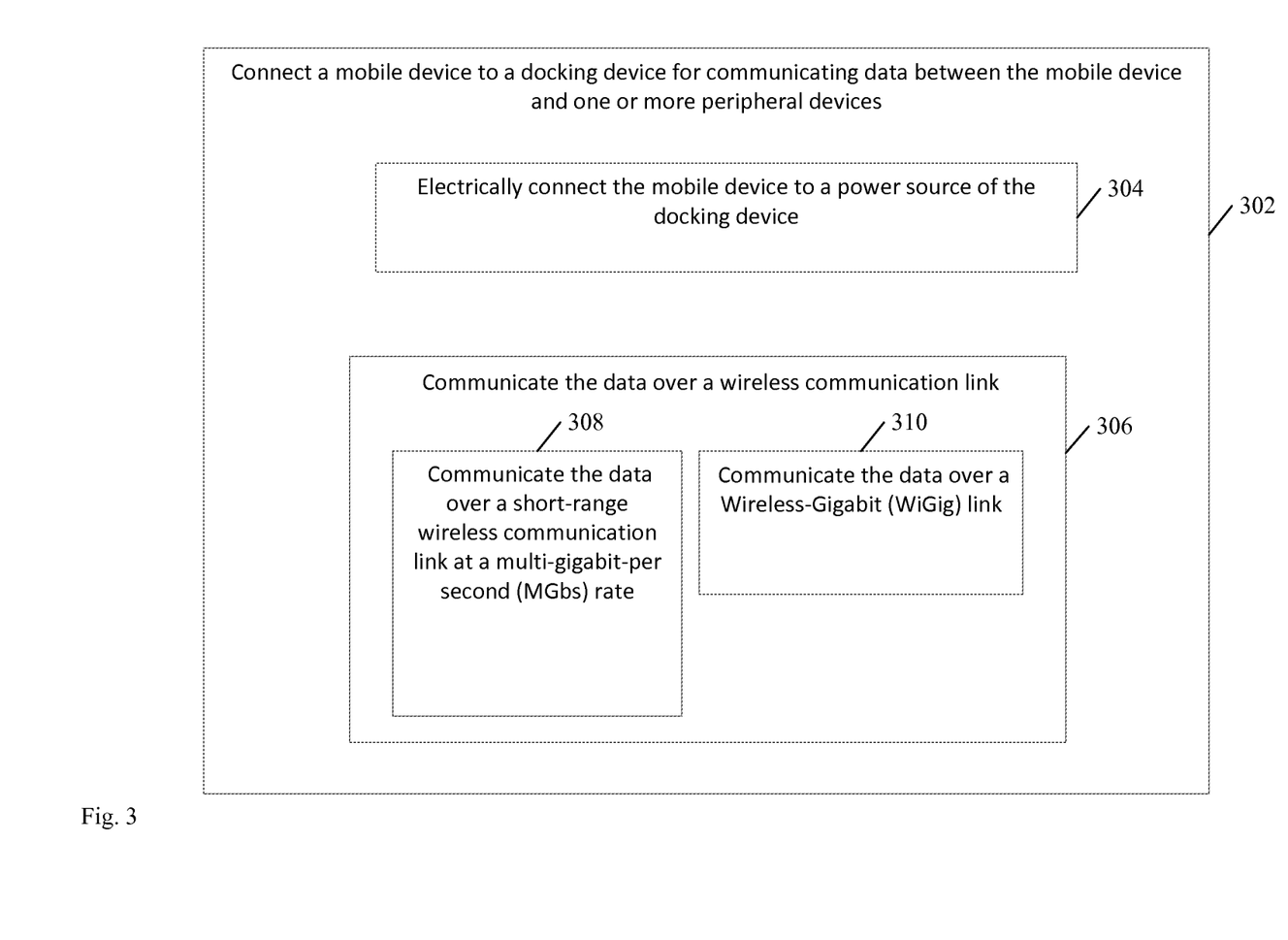
FIG. 3 is a schematic flow-chart illustration of a method of connecting a mobile device to one or more peripheral devices, in accordance with some demonstrative embodiments.

Reference is made to FIG. 3, which schematically illustrates a method of connecting a mobile device to one or more peripheral devices, in accordance with some demonstrative embodiments. In some embodiments, one or more of the operations of the method of FIG. 3 may be performed by a wireless communication system, e.g., system 100 (FIG. 1); a mobile device, e.g., device 104 (FIG. 1); a docking device, e.g., docking device 102 (FIG. 1); and/or a wireless communication unit, e.g., wireless communication units 110 and/or 120 (FIG. 1).

As indicated at block 302, the method may include connecting a mobile device to a docking device for communicating data between the mobile device and one or more peripheral devices. For example, device 104 (FIG. 1) may be connected to docking device 102 (FIG. 1) for communicating data between mobile device 104 (FIG. 1) and one or more peripheral devices 150 (FIG. 1), e.g., as described above.

As indicated at block 304, connecting the mobile device to the docking device may include electrically connecting the mobile device to a power source of the docking device. For example, device 104 (FIG. 1) may be electrically connected to power supply 155 (FIG. 1), via docking device 102 (FIG. 1), e.g., as described above.

As indicated at block 306, connecting the mobile device to the docking device may include communicating the data between the mobile device and the docking device over a wireless communication link. For example, wireless communication unit 120 (FIG. 1) and wireless communication unit 110 (FIG. 1) may communicate the data between device 104 (FIG. 1) and docking device 102 (FIG. 1) over a wireless communication link 103 (FIG. 1), e.g., as described above.

As indicated at block 308, communicating the data between the mobile device and the docking device may include communicating the data over a short-range wireless communication link at a MGbs rate. For example, wireless communication unit 120 (FIG. 1) and wireless communication unit 110 (FIG. 1) may communicate the data over wireless communication link 103 (FIG. 1) including a short range wireless communication link at MGbs rate, e.g., as described above.

As indicated at block 310, communicating the data between the mobile device and the docking device may include communicating the data over a WiGig link. For example, wireless communication unit 120 (FIG. 1) and wireless communication unit 110 (FIG. 1) may communicate the data over wireless communication link 103 (FIG. 1) including WiGig link, e.g., as described above.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A mobile device comprising:
a docking connector to connect said mobile device to a docking device, the docking connector comprising:
a power connector to electrically connect said mobile device to a power source of said docking device; and
a wireless communication unit housed within the docking connector, the wireless communication unit to communicate data between said mobile device and said docking device over a wireless communication link, the wireless communication link comprises a short-range wireless communication link at a multi-gigabit-per second (MGbs) rate.

2. The mobile device of claim 1, wherein said docking connector comprises a magnetic element to couple said docking connector to said docking device by magnetic force.

3. The mobile device of claim 1, wherein said wireless communication link comprises a Wireless-Gigabit (WiGig) link.

4. The mobile device of claim 1, wherein said short-range wireless communication link has a range of no more than five centimeters.

5. The mobile device of claim 1, wherein said wireless communication unit to communicate said data with another wireless communication unit included in said docking device.

6. The mobile device of claim 1, wherein said docking connector comprises a zero-force connector.

7. The mobile device of claim 1 comprising a device selected from the group consisting of a Smartphone and a mobile computer.

8. A docking connector to connect a mobile device to a docking device, the docking connector comprising:
a power connector to electrically connect said mobile device to a power source of said docking device; and
a wireless communication unit housed within the docking connector, the wireless communication unit to communicate data between said mobile device and said docking device over a wireless communication link, the wireless communication link comprises a short-range wireless communication link at a multi-gigabit-per second (MGbs) rate.

9. The mobile device of claim 3, wherein said wireless communication unit is to communicate said data over a link selected from the group consisting of a WiGig Serial Extension (WSE) link, a WiGig Display Extension (WDE) link, a WiGig Bus Extension (WBE) link, and a WiGig Secure Digital extension (WSD) link.

10. The docking connector of claim 8, wherein said wireless communication unit to communicate said data with another wireless communication unit included in said docking device.

11. A docking device to transfer data between a mobile device and one or more peripheral devices, the docking device comprising:
a power plug to be connected to a power supply;
one or more peripheral connectors to be connected to the one or more peripheral devices for communicating data with said peripheral devices;
a docking connector to connect said docking device to said mobile device, the docking connector comprising:
a power connector to receive electrical power from said power supply via said power plug, and to transfer said electrical power to said mobile device; and
a wireless communication unit to communicate said data between said docking device and said mobile device over a wireless communication link; and
a cable connecting between said one or more peripheral connectors and said docking connector, the cable to transfer said data between said one or more peripheral connectors and said wireless communication unit, and to transfer said electrical power from said power plug to said power connector.

12. The docking device of claim 11 comprising a power storage to provide electric power to said wireless communication unit and to at least one of said peripheral connectors.

13. The docking device of claim 11, wherein said wireless communication link comprises a Wireless-Gigabit (WiGig) link.

14. The docking device of claim 11, wherein said docking connector is to be physically coupled to said mobile device.

15. The docking device of claim 11, wherein said docking connector comprises a magnetic element to couple said docking connector to said mobile device by magnetic force.

16. The docking device of claim 11, wherein said docking connector comprises a plug-less connector.

17. The docking device of claim 11, wherein said docking connector comprises a zero-force connector.

18. The docking device of claim 11, wherein said wireless communication link comprises a short-range wireless communication link at a multi-gigabit-per second (MGbs) rate.

19. The docking device of claim 18, wherein said short-range wireless communication link has a range of no more than five centimeters.

20. The docking connector of claim 8, wherein said short-range wireless communication link has a range of no more than five centimeters.

* * * * *